(12) United States Patent
Haugstetter

(10) Patent No.: US 10,704,847 B2
(45) Date of Patent: Jul. 7, 2020

(54) ROTATING HEAT EXCHANGER/BYPASS COMBO

(71) Applicant: Hamilton Sundstrand Corporation, Charlotte, NC (US)

(72) Inventor: Christoph Haugstetter, West Hartford, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 74 days.

(21) Appl. No.: 15/709,795

(22) Filed: Sep. 20, 2017

(65) Prior Publication Data

US 2019/0084376 A1 Mar. 21, 2019

(51) Int. Cl.
| | | |
|---|---|---|
| *F28F 27/00* | (2006.01) | |
| *F28F 27/02* | (2006.01) | |
| *F25B 17/12* | (2006.01) | |
| *F01K 11/04* | (2006.01) | |
| *F28F 17/00* | (2006.01) | |
| *F28D 15/00* | (2006.01) | |
| *F25B 9/00* | (2006.01) | |
| *F02G 1/055* | (2006.01) | |
| *F02C 1/10* | (2006.01) | |

(52) U.S. Cl.
CPC .............. *F28F 27/02* (2013.01); *F01K 11/04* (2013.01); *F25B 9/004* (2013.01); *F25B 17/12* (2013.01); *F28D 15/00* (2013.01); *F28F 17/00* (2013.01); *F28F 27/00* (2013.01); *F02C 1/10* (2013.01); *F02G 1/055* (2013.01)

(58) Field of Classification Search
CPC .......... F28F 19/006; F28F 17/00; F28F 27/02; B64D 2013/0614

USPC .......................................................... 165/97
See application file for complete search history.

(56) References Cited

U.S. PATENT DOCUMENTS

| | | | |
|---|---|---|---|
| 4,215,817 A | 8/1980 | Delaporte | |
| 5,839,292 A | 11/1998 | Hwang | |
| 6,796,527 B1* | 9/2004 | Munoz | B64D 13/06 244/118.5 |
| 7,805,960 B2 | 10/2010 | Magnetto | |
| 2013/0180681 A1* | 7/2013 | Magee | F28F 9/013 165/11.1 |
| 2014/0026601 A1 | 1/2014 | Chen | |
| 2016/0102631 A1 | 4/2016 | Lynn | |

FOREIGN PATENT DOCUMENTS

| | | |
|---|---|---|
| EP | 3006866 A1 | 4/2016 |
| WO | 2015083392 A1 | 6/2015 |

OTHER PUBLICATIONS

European Search Report; EP 18184446 dated May 6, 2019; 9 pages.

* cited by examiner

*Primary Examiner* — Eric S Ruppert
(74) *Attorney, Agent, or Firm* — Cantor Colburn LLP

(57) ABSTRACT

A system is provided. The system includes at least two heat exchangers that are alternatively cooled by an outlet medium. The system also includes a cooling circuit that provides a cooling medium to the at least two heat exchangers. The cooling circuit provides the cooling medium to a first heat exchanger of the at least two heat exchangers in accordance with a first mode. The cooling circuit provide the cooling medium to a second heat exchanger of the at least two heat exchangers in accordance with a second mode.

7 Claims, 9 Drawing Sheets

ROTATING HEAT EXCHANGER/BYPASS COMBO

STATEMENT OF FEDERAL SUPPORT

This invention was made with Government support under FA8650-16-D-2617 awarded by Air Force Research Laboratory. The Government has certain rights in the invention.

BACKGROUND

Environmental control systems manage thermal loads on aircrafts, typically exhausting excess internal heat. With respect to next generation aircrafts with significantly upsized thermal load requirements, low turbine outlet temperatures are required to limit the necessary bleed flows. Yet, low turbine outlet temperatures can lead to freezing challenges.

BRIEF DESCRIPTION

In accordance with one or more embodiments, a system that includes at least two heat exchangers being alternatively cooled by an outlet medium is provided. The system also includes a cooling circuit providing a cooling medium to the at least two heat exchangers. The cooling circuit provides the cooling medium to a first heat exchanger of the at least two heat exchangers in accordance with a first mode and provides the cooling medium to a second heat exchanger of the at least two heat exchangers in accordance with a second mode.

In accordance with one or more embodiments or the above system, the first heat exchanger can receive the outlet medium during the second mode and the second heat exchanger can receive the outlet medium during the first mode.

In accordance with one or more embodiments or any of the above systems, the cooling circuit can reverse a flow of the cooling medium in accordance with the first and second modes to provide the cooling medium to the first and second heat exchangers, respectively.

In accordance with one or more embodiments or any of the above systems, during the first mode, the cooling medium can defrost the first heat exchanger and the cooling medium can be cooled by the outlet medium flowing through the second heat exchanger.

In accordance with one or more embodiments or any of the above systems, during the second mode, the cooling medium can defrost the second heat exchanger and the cooling medium can be cooled by the outlet medium flowing through the first heat exchanger.

In accordance with one or more embodiments or any of the above systems, the system can comprise at least one diverter valve directing the outlet medium to the first heat exchanger during the second mode and directing the outlet medium to the second heat exchanger during the first mode.

In accordance with one or more embodiments or any of the above systems, the system can comprise at least one rotatable valve directing the outlet medium across the first heat exchanger during the second mode and directing the outlet medium across the second heat exchanger during the first mode.

In accordance with one or more embodiments or any of the above systems, the system can comprise a drum shell and a drum rotational member encasing the at least two heat exchanger, wherein the drum shell comprises a fixed entry point for the outlet medium, and wherein the drum rotational member rotates within the drum shell to couple the first heat exchanger with the fixed entry point during the second mode and to couple the second heat exchanger with the fixed entry point during the first mode.

In accordance with one or more embodiments or any of the above systems, the cooling circuit can comprise one or more load heat exchangers through which a flow direction remains while a flow of the cooling medium is reversed in accordance with the first and second modes.

In accordance with one or more embodiments or any of the above systems, the cooling medium can comprise a silicon oil and the outlet medium can comprise bleed air.

In accordance with one or more embodiments, a system that includes a first heat exchanger; a second heat exchanger; and a cooling circuit is provided. The cooling circuit is configured to alternate a defrosting of the first heat exchanger and the second heat exchanger by providing a cooling medium to one of the first and second heat exchangers for defrosting while a remaining one of the first and second heat exchangers is cooled by the outlet medium flowing through there through.

In accordance with one or more embodiments or the above system, the cooling circuit can be configured to reverse a flow of the cooling medium to directly provide the cooling medium to the first and second heat exchangers during the respective defrosting.

In accordance with one or more embodiments or any of the above systems, the system can comprise at least one diverter valve directing the first medium to the first heat exchanger while the second heat exchanger is defrosting or directing the first medium to the second heat exchanger while the first heat exchanger is defrosting.

In accordance with one or more embodiments or any of the above systems, the system can comprise at least one rotatable valve directing the first medium across the first heat exchanger while the second heat exchanger is defrosting or directing the first medium across the second heat exchanger while the first heat exchanger is defrosting.

In accordance with one or more embodiments or any of the above systems, the system can comprise a drum shell and a drum rotational member encasing the first and second heat exchangers, wherein the drum shell comprises a fixed entry point for the first medium, and wherein the drum rotational member rotates within the drum shell to couple the first heat exchanger with the fixed entry point while the second heat exchanger is defrosting and to couple the second heat exchanger with the fixed entry point while the first heat exchanger is defrosting.

In accordance with one or more embodiments or any of the above systems, the cooling circuit can comprise one or more load heat exchangers through which a flow direction remains while a flow of the cooling medium is reversed in accordance with the first and second modes.

In accordance with one or more embodiments or any of the above systems, the first medium can comprise a silicon oil and the second medium can comprise bleed air exhausted from a turbine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
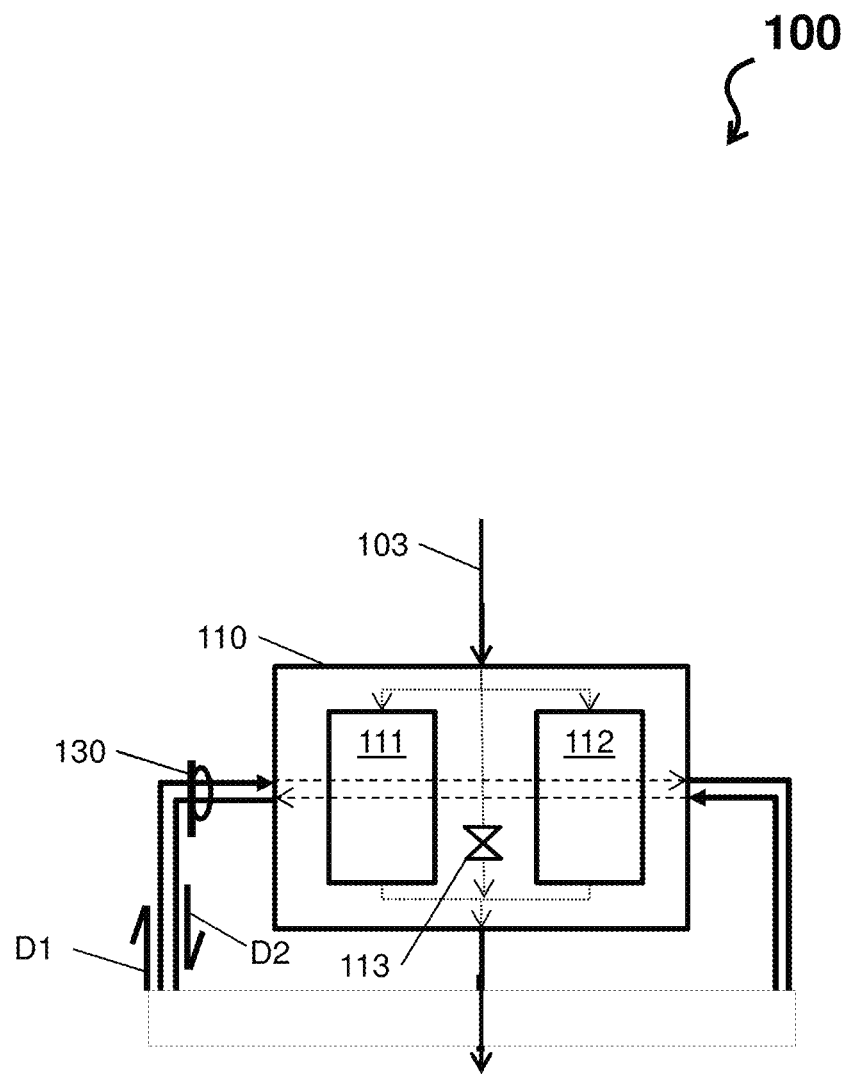
FIG. 1 depicts a cooling system in accordance with one or more embodiments.

Turning now to FIG. 1, a cooling system 100 is depicted in accordance with one or more embodiments. The cooling system 100 can be implemented within any aircraft, including a fighter jet. The cooling system 100 comprises a first medium 103 and a heat exchanger subsystem 110. The first medium 103 can be received from a system external to the cooling system 100, such as an air cycle machine or alternative source of cold air (e.g., obtained through air compression, intercooling, and expansion through a turbine). Further, for example, the first medium can comprise bleed air from a bleed system of an aircraft (e.g., system external to the cooling system 100).

The heat exchanger subsystem 110 can comprise at least two heat exchangers (as shown in FIG. 1, a first heat exchanger 111 and a second heat exchanger 112) and a bypass valve 113. The at least two heat exchangers can utilize second medium of a cooling circuit 130 to alternate defrosting and cooling operations. The first heat exchanger 111 and the second heat exchanger 112 are devices built for efficient heat transfer from one medium (e.g., the first medium 103) to another (e.g., the second medium). Examples of heat exchangers include double pipe, shell and tube, plate, plate and shell, adiabatic wheel, plate fin, pillow plate, and fluid heat exchangers. In accordance with one or more embodiments, the at least two heat exchangers can be downstream of a turbine of an air cycle machine and can be referred to as sink heat exchangers (as opposed to load heat exchangers). The bypass valve 113 and bypass path around the sink heat exchangers can be optional. Further, the cooling circuit 130 can include one or more load heat exchangers as further described here with respect to FIG. 2A.

The second medium can be a cooling medium, heat transfer fluid such as a silicon oil that doesn't freeze at −73.3 degrees Celsius (−100 degrees Fahrenheit) or other low temperature heat transfer fluid. The elements of the cooling system 100 are connected via valves, tubes, pipes, and the like. Valves (e.g., flow regulation device or mass flow valve) are devices that regulate, direct, and/or control a flow of the first and second mediums by opening, closing, or partially obstructing various passageways within the tubes, pipes, etc. of the cooling system 100. Valves can be operated by actuators, such that flow rates of the first and second mediums in any portion of the cooling system 100 can be regulated to a desired value. The cooling circuit 130 can alternate a defrosting of the first heat exchanger 111 and the second heat exchanger 112 by providing the cooling medium to one of the first and second heat exchangers 111, 112 for defrosting while a remaining one of the first and second heat exchangers 111, 112 utilizes the first/outlet medium to cool the cooling medium. The cooling circuit 130 can operate in accordance with one or more modes of operation (i.e., modes).

In accordance with one or more embodiments, the cooling circuit 130 provides the cooling medium to the first heat exchanger 111 in accordance with a first mode and provides the cooling medium to the second heat exchanger 112 in accordance with a second mode, such that the first heat exchanger 111 can receive the first or outlet medium during the second mode and the second heat exchanger 112 can receive the outlet medium during the first mode. For example, during the first mode, the cooling medium first defrosts the first heat exchanger 111 and then gets cooled by the outlet medium flowing through the second heat exchanger 112; and during the second mode, the cooling medium first defrosts the second heat exchanger 112 and gets cooled by the outlet medium flowing through the first heat exchanger 111. In this way, the cooling circuit 130 can reverse a flow of the cooling medium through the first and heat exchangers 111 and 112 in accordance with the first and second modes to provide the warm cooling medium to the first and second heat exchangers 111, 112, during the respective defrosting. As shown in FIG. 1, the cooling medium can flow in a first direction D1 or a second direction D2. And, while two looping arrows are shown for the cooling circuit 130, the two arrows 130 are representative of the flow of the medium in accordance with the first and the second directions D1, D2.

Note that, during defrost, melted ice may result in condensate (e.g., water droplets) adhering to the inside of the heat exchanger subsystem 110 (e.g., in the middle of the first heat exchanger 111 and the second heat exchanger 112). Thus, the cooling system 100 can utilize a mechanism to clear the heat exchanger subsystem 110. In accordance with one or more embodiments, each defrost operation can execute during a defrost cycle. The defrost cycle can last for a predetermined period of time. At the end of and/or within the defrost cycle, a medium (such as bleed air) can be sent in a burst for an interval of time (e.g., 5 seconds) to clear the heat exchanger subsystem 110. In accordance with one or more embodiments, a medium (such as bleed air) can continuously flow through the heat exchanger being defrosted during the defrost cycle.

Figure 2A:
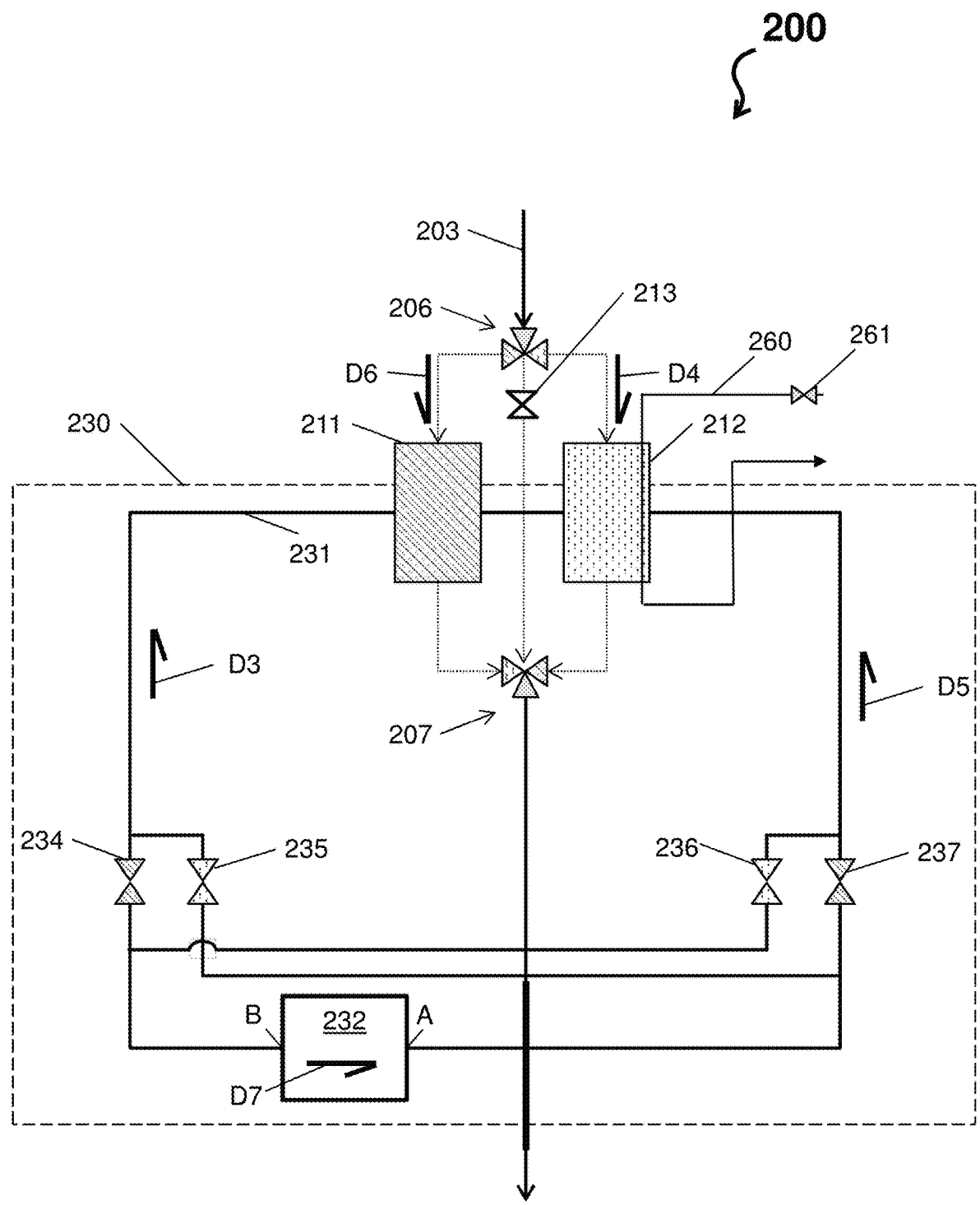
FIG. 2A depicts a valve system in accordance with one or more embodiments.

Turning now to FIG. 2A, a valve system 200 is depicted in accordance with one or more embodiments. The valve system 200 can be considered an example of the cooling system 100 of FIG. 1, and components of the valve system 200 that are similar to that of the cooling system 100 of FIG. 1 are not re-introduced for ease of explanation. The valve system 200 comprises a first medium 203, a first valve 206 (e.g., a diverter valve), a second valve 207, a first heat exchanger 211, a second heat exchanger 212, a bypass valve 213, and a cooling circuit 230. The cooling circuit 230 comprises at least a cooling medium 231, a cooling load 232, a first cooling valve 234, a second cooling valve 235, a third cooling valve 236, and a forth cooling valve 237. The valve system 200 comprises a clearing medium 260 and a clearing valve 261.

As shown in FIG. 2A, the cooling circuit 230 can direct the cooling medium 231 in a direction D3 to the first heat exchanger 211 while the second heat exchanger 212 is being cooled by the first medium 203 flowing in a direction D4. The first medium 203 can be provided in the direction D4 by the first valve 206. The cooling medium 231 can be provided in the direction D3 when the cooling circuit 230 closes the first cooling valve 234 and the forth cooling valve 237 and opens the second cooling valve 235 and the third cooling valve 236. By directly providing the cooling medium 231 in the direction D3 to the first heat exchanger 211, the cooling circuit 230 is defrosting the first heat exchanger 211. A first mode of operation of the valve system 200 can be considered a first heat exchanger 211 defrosting operation.

Also, as shown in FIG. 2A, the cooling circuit 230 can direct the cooling medium 231 in a direction D5 to the second heat exchanger 212 while the first heat exchanger 211 is being cooled by the first medium 203 flowing in a direction D6. The first medium 203 can be provided in the direction D6 by the first valve 206. The cooling medium 231 can be provided in the direction D5 when the cooling circuit 230 opens the first cooling valve 234 and the forth cooling valve 237 and closes the second cooling valve 235 and the third cooling valve 236. By directly providing the cooling medium 231 in the direction D5 to the second heat exchanger 212, the cooling circuit 230 is defrosting the second heat exchanger 212. A second mode of operation of the valve system 200 can be considered a second heat exchanger 212 defrosting operation. Thus, the valve system 200 can direct the first medium 203 to the first heat exchanger 211 while the second heat exchanger 212 is defrosting or direct the first medium 203 to the second heat exchanger 212 while the first heat exchanger 212 is defrosting. Note that while direction D3 and direction D5 are reversed flows, a flow direction D7 through the cooling load 232, which can include a pump and a load heat exchanger, does not change. For example, as shown in FIG. 2A, the cooling medium 231 flows to out of the cooling load 232 via a first side A (e.g., driven in the flow directions D7 by the pump) and flows into the cooling load 232 via a second side B (e.g., received in the flow directions D7 by the load heat exchanger).

Optionally, the valve system 200 can include and utilize the bypass valve 213 to cause the first medium 213 to flow through a bypass path around the first and second heat exchangers 211 and 212 (e.g., Optionally, a diverter valve channeling flow around both of the heat exchangers). Note that the clearing medium 260 can be provided by the clearing control valve 261 to remove any condensate or liquid droplets that may hang in the second heat exchanger 212 during or after defrosting (similar components and operations can be employed during or after the defrosting of the first heat exchanger 211).

Figure 2B:
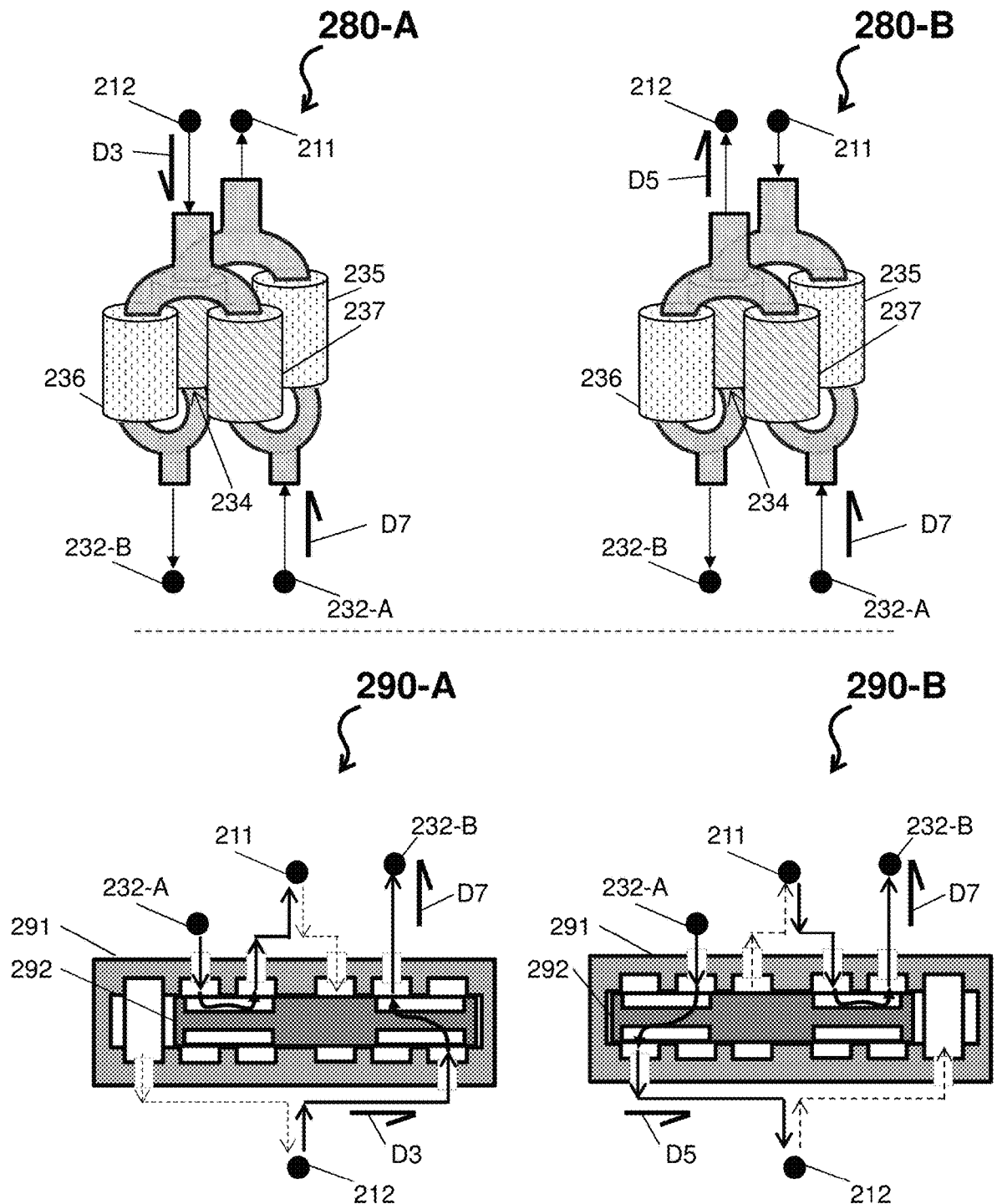
FIG. 2B depicts valve arrangements in accordance with one or more embodiments.

FIG. 2B depicts a valve arrangement 280 (in a first mode A and a second mode B) and a valve arrangement 290 (in a first mode A and a second mode B) in accordance with one or more embodiments. The valve arrangement 280 can be four separate valves (e.g., the first cooling valve 234, the second cooling valve 235, the third cooling valve 236, and the forth cooling valve 237). Note that in the first mode A, the cooling medium 231 of the valve arrangement 280 flows to out of the first side of the cooling load 232-A (e.g., in the flow directions D7) and flows in the direction D3 through the first heat exchanger 211 and the second heat exchanger 212. Further, in the second mode B, the cooling medium 231 flows to out of the first side of the cooling load 232-A (e.g., in the flow directions D7) and flows in the direction D7 through the second heat exchanger 212 and the first heat exchanger 211.

The valve arrangement 290 can be a hydraulic multi-port valve with a shell 291 and an internal piston 292. The internal piston 292 can move within the shell 291 to open or close particular pathways. In the first mode A, the cooling medium 231 of the valve arrangement 290 flows to out of the first side of the cooling load 232-A (e.g., in the flow directions D7) and flows in the direction D3 through the first heat exchanger 211 and the second heat exchanger 212. Further, in the second mode B, the cooling medium 231 of the valve arrangement 290 flows to out of the first side of the cooling load 232-A (e.g., in the flow directions D7) and flows in the direction D7 through the second heat exchanger 212 and the first heat exchanger 211.

Figure 3A:
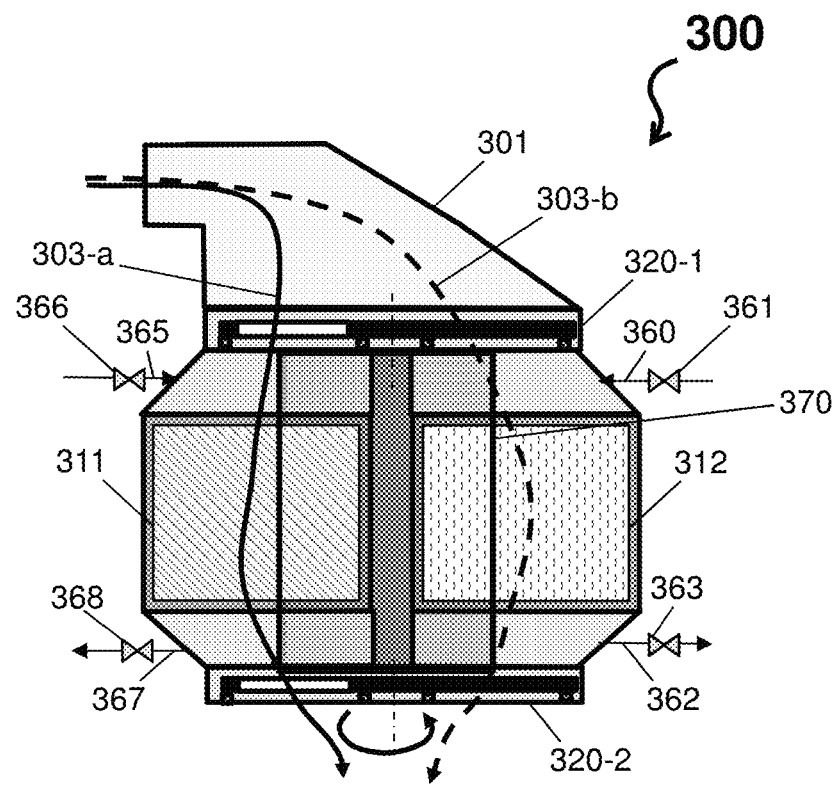
FIG. 3A depicts a rotatable valve system in accordance with one or more embodiments.
Figure 3B:
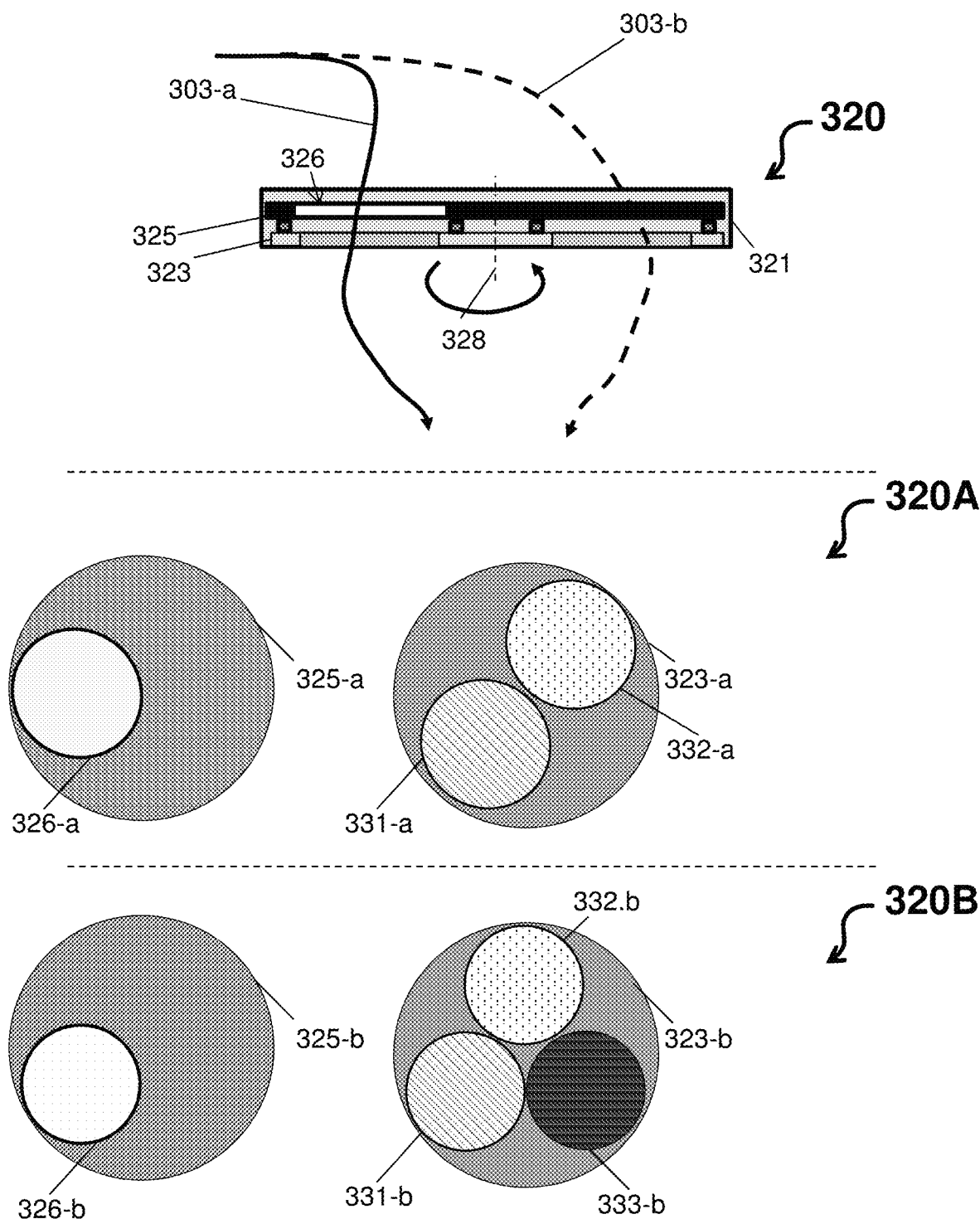
FIG. 3B depicts a rotatable valve in accordance with one or more embodiments.
Figure 3C:
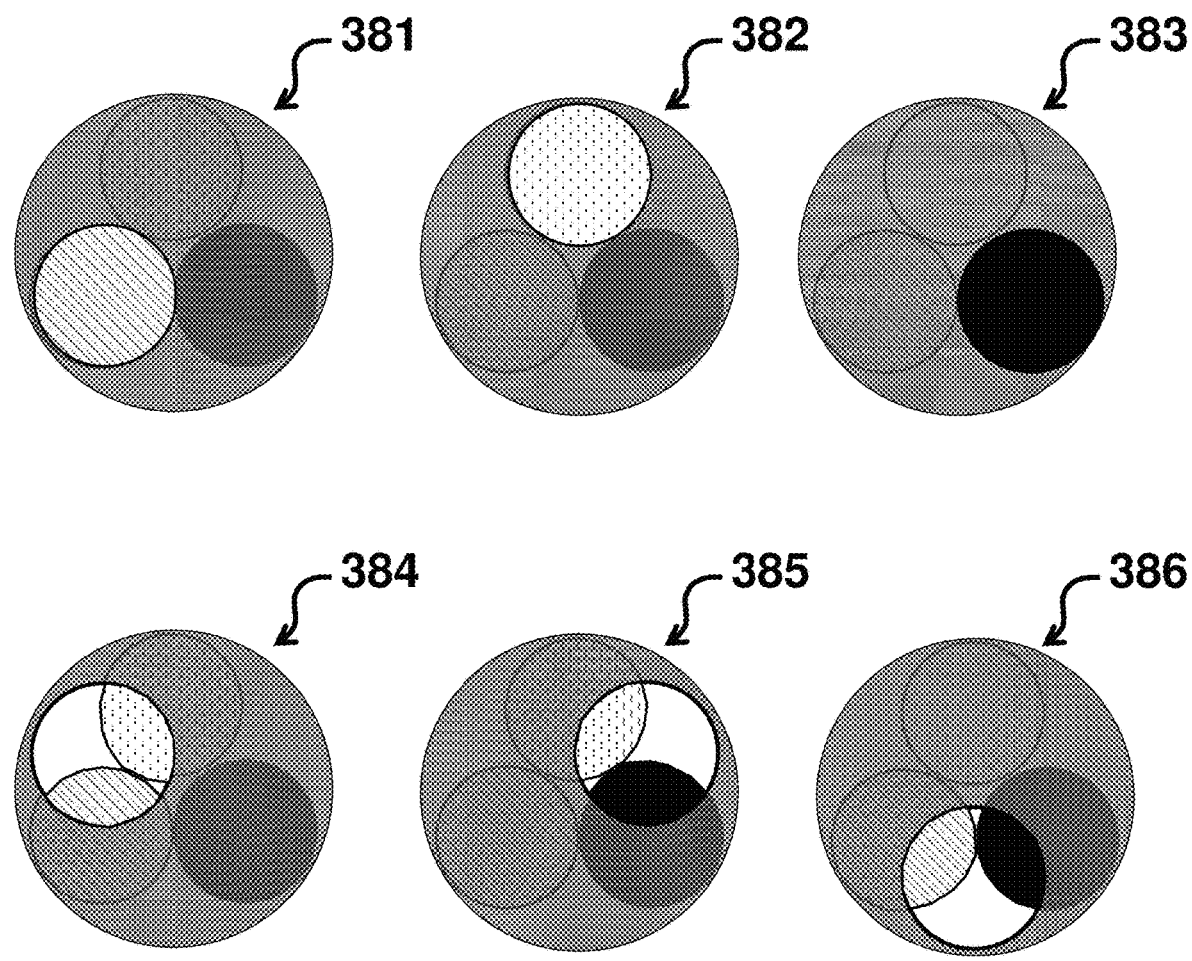
FIG. 3C depicts position examples of a rotatable valve in accordance with one or more embodiments.

Turning now to FIG. 3A, FIG. 3B, and FIG. 3C, the cooling system 100 of FIG. 1 and the valve system 200 of FIG. 2A are further described with modifications in accordance with one or more embodiments. In FIG. 3A, a rotatable valve system 300 is depicted in accordance with one or more embodiments. The rotatable valve system 300 can be considered an example of the cooling system 100 of FIG. 1 and/or the valve system 200 of FIG. 2A, and components of the rotatable valve system 300 that are similar to that of the cooling system 100 of FIG. 1 and/or the valve system 200 of FIG. 2A are not re-introduced for ease of explanation. The rotatable valve system 300 comprises a manifold 301, a first flow path 303-*a* of the first medium, a second flow path 303-*b* of the first medium, a first heat exchanger 311, a second heat exchanger 312, at least one rotatable valve (e.g., a first rotatable valve 320-1 and/or a second rotatable valve 320-2), and a bypass feature 370.

Turning to FIG. 3B, the first rotatable valve 320-1 and the second rotatable valve 320-2 of FIG. 3A are further described and depicted as a rotatable valve 320 in accordance with one or more embodiments. The rotatable valve 320 can comprise a housing 321 enclosing a duct plate 323 and a rotational disk 325. The rotational disk 325 can comprise an opening 326 and can move in a rotational direction 328 (e.g., clockwise or counterclockwise). The duct plate 323 can comprise one or more openings that, based on a rotation position of the rotational disk 325, align with the opening 326. In accordance with one or more embodiments, the rotatable valve 320 can be manufactured according to a first configuration 320A or a second configuration 320B.

Under the first configuration 320A, the rotatable valve 320 comprises a duct plate 323-*a* and a rotational disk 325-*a*. The rotational disk 325-*a* comprises an opening 326-*a*, and the duct plate 323-*a* comprises openings 331-*a* and 332-*b*. Note that the openings 331-*a* and 332-*b* are sized to match the opening 326-*a*.

Under the second configuration 320B, the rotatable valve 320 comprises a duct plate 323-*b* and a rotational disk 325-*b*. The rotational disk 325-*b* comprises an opening 326-*b*, and the duct plate 323-*b* comprises openings 331-*b*, 332-*b*, and a bypass 333-*b*. Note that the openings 331-*a* and 332-*b* and the bypass 333-*b* are sized to match the opening 326-*b*. Note that the bypass 333-*b* is constructed to allow partial (or full) bypassing of the first medium (i.e., around the first heat exchanger 311 and the second heat exchanger 312 through the bypass feature 370).

In operation, the rotational valve system 300 can direct the first medium entering the manifold 301 along the first flow path 303-*a* and across the first heat exchanger 311 or direct the first medium entering the manifold 301 along the second flow path 303-*b* and across the second heat exchanger 312 based on a rotational position of the first rotatable valve 320-1 and/or the second rotatable valve 320-2. With respect to the above first and second modes, the first flow path 303-*a* can correspond to a second mode, and the second flow path 303-*b* can correspond to a first mode.

In this way, the first rotatable valve 320-1 and/or the second rotatable valve 320-2 can direct the first medium across the first heat exchanger while the second heat exchanger is defrosting and direct the first medium across the second heat exchanger while the first heat exchanger is defrosting. A flow rate of the first medium can be proportional to a coupling between the duct plate 323 and the rotational disk 325.

Turning to FIG. 3C, position examples according to the second configuration 320B are depicted in accordance with one or more embodiments. A first position 381 depicts a full alignment of the opening 326-b with the opening 331-b (e.g., with the first heat exchanger 311). A second position 382 depicts a full alignment of the opening 326-b with the opening 332-b (e.g., with the second heat exchanger 312). A third position 383 depicts a full alignment of the opening 326-b with the bypass 333-b. A fourth position 384 depicts a partial alignment of the opening 326-b with the openings 331-b and 332-b (e.g., allowing a divided flow of the first medium to the first and second heat exchangers 331, 312). Note that the fourth position 384 can be utilized when negligible amounts of air moisture are present and frosting of heat exchanger surfaces is not a concern. In this regard, the rotatable valve 320 provides the technical effects and benefits of an effectively larger (combined) heat exchanger w/higher heat transfer rates and lower pressure drop (for the first medium).

A fifth position 385 depicts a partial alignment of the opening 326-b with the opening 332-b and the bypass 333-b (e.g., allowing a partial flow of the first medium to the second heat exchanger 332). A sixth position 386 depicts a partial alignment of the opening 326-b with the opening 331-b and the bypass 333-b (e.g., allowing a partial flow of the first medium to the first heat exchanger 331). Note that the fifth position 385 and/or the sixth position 386 can be referred to as a partial bypass flow (while the third position 383 can be referred to as full bypass flow). Bypass flows can be used if a liquid loop does not require all available cooling and/or a downstream system of the first medium requires colder temperatures.

Returning to FIG. 3A, rotatable valve system 300 comprises a first clearing path 360 coupled to a first clearing valve 361, a second clearing path 362 coupled to a second clearing valve 363, a third clearing path 365 coupled to a third clearing valve 366, and a fourth clearing path 367 coupled to a fourth clearing valve 368. A clearing medium (e.g., a burst or continuous flow of bleed air) can be provided by along the first and second clearing paths 360 and 362 by the first and second clearing valves 361 and 363 to remove any condensate or liquid droplets that may hang in the second heat exchanger 212 during or after defrosting. The clearing medium can, also, be provided by along the third and fourth clearing paths 365 and 367 by the third and fourth clearing valves 366 and 368 to remove any condensate or liquid droplets that may hang in the first heat exchanger 211 during or after defrosting.

Figure 4A:
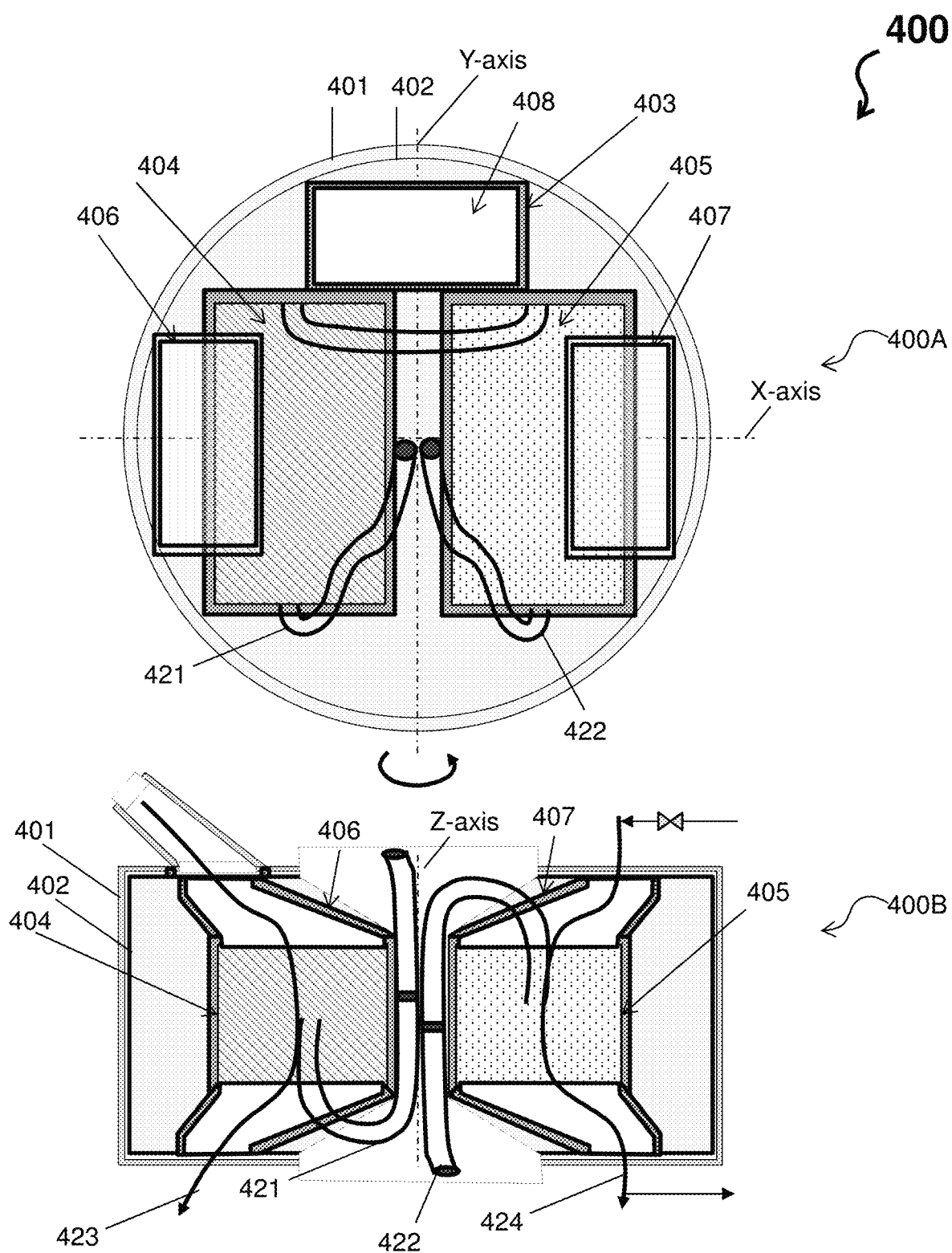
FIG. 4A depicts a drum system in accordance with one or more embodiments.

Turning now to FIG. 4A, a drum system 400 is depicted in accordance with one or more embodiments. The drum system 400 is show from a first view 400A (from a Z perspective above an X-Y plain) and a second view 400B (from the X-Y plain perspective viewing a Z axis). The drum system 400 comprises a drum shell 401, a drum rotational member 402, insulation 403, at least one core (e.g., cores 404 and 405—first and second heat exchangers), at least one manifold (e.g., each manifold 406 and 407 corresponding to the cores 404 and 405), a bypass, 408, and at least one cooling medium tube (e.g., cooling medium tubes 421 and 422).

In the intake view 400A, the first medium 423 flows into the cores 404 and 405 along the Z-axis. As shown in the second view 400B, the first medium 423 enters through the drum shell 401 and the drum rotational member 402 to pass through an aligned core (e.g., core 404 as shown). In this regard, the drum shell 401 comprises a fixed entry point for receiving the first medium 423 (and can also have a fixed exit point in accordance with one or more embodiments), such that the drum rotational member 402 and components therein rotate within the drum shell 401 to couple one of the cores 404, 405 with the fixed entry point. Note that the cooling medium tubes 421, 422 rotate with the drum rotational member 402.

The rotational position of the drum rotational member 402 can be in accordance with the modes of operation described herein. For instance, the drum rotational member 402 can rotate within the drum shell 401 to align/couple the core 404 (e.g., a first heat exchanger) with the fixed entry point to enable the core 405 (e.g., a second heat exchanger) to defrost via the cooling medium tube 422. Further, the drum rotational member 402 can rotate within the drum shell 401 to align/couple the core 405 (e.g., the second heat exchanger) with the fixed entry point to enable the core 404 (e.g., the first heat exchanger) to defrost via the cooling medium tube 421.

Figure 4B:
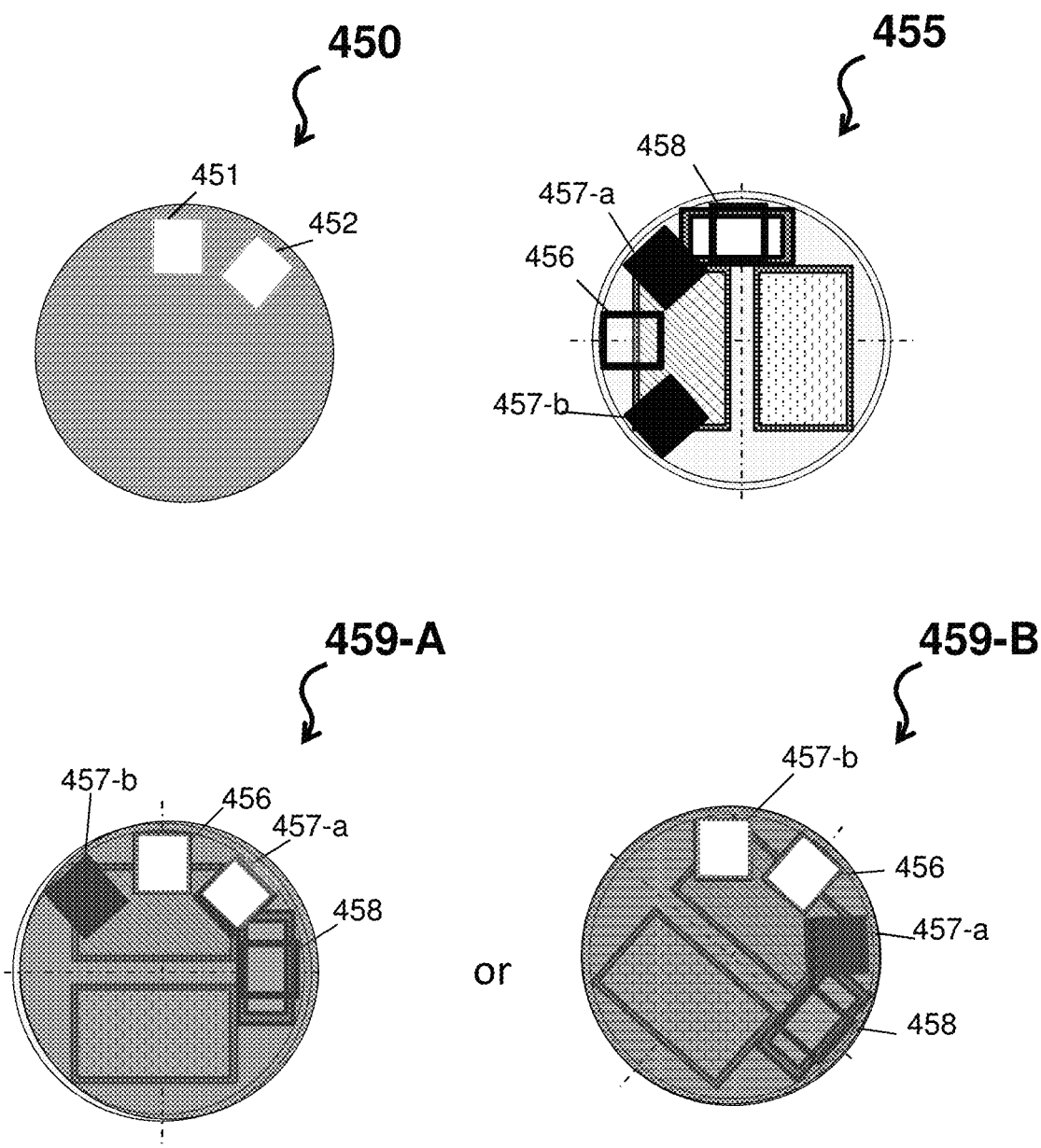
FIG. 4B depicts a drum shell and a drum rotational member in accordance with one or more embodiments.

Turning now to FIG. 4B, a drum shell 450 and a drum rotational member 455 are depicted in accordance with one or more embodiments. The drum shell 450 can comprise at least two fixed entry points 451 and 452, where one entry point can be for the first medium, while the other entry point can be for blowing out condensate. The drum rotational member 455 can comprise four manifold inlets. An inlet 456 can be for the core 404 of FIG. 4A. A second inlet 457-a and 457-b can be two inlets feeding one manifold for the core 405 of FIG. 4A. An inlet 458 can be a bypass. Note that, based on a rotation position of the drum rotational member 451, the inlets 456, 457-a, 457-b, and 458 can align with the fixed entry points 461 and 462. Note that the manifold 456 can be a passage for receiving the first medium by the core 404 of FIG. 4A, the manifold 472-a/472-b can be a passage for receiving the first medium by the core 405 of FIG. 4A, and manifold 473 can be a passage for receiving the first medium by the bypass 408 of FIG. 4A.

Note that FIG. 4B further shows a first position 459-A and a second position 459-B with respect to the drum shell 450 and the drum rotational member 455 in accordance with one or more embodiments. The first position 459-A illustrates a configuration wither the core 404 of FIG. 4A gets cooled and the core 405 gets defrosted. The first position 459-B illustrates a configuration wither the core 405 of FIG. 4A gets cooled and the core 404 gets defrosted.

Figure 4C:
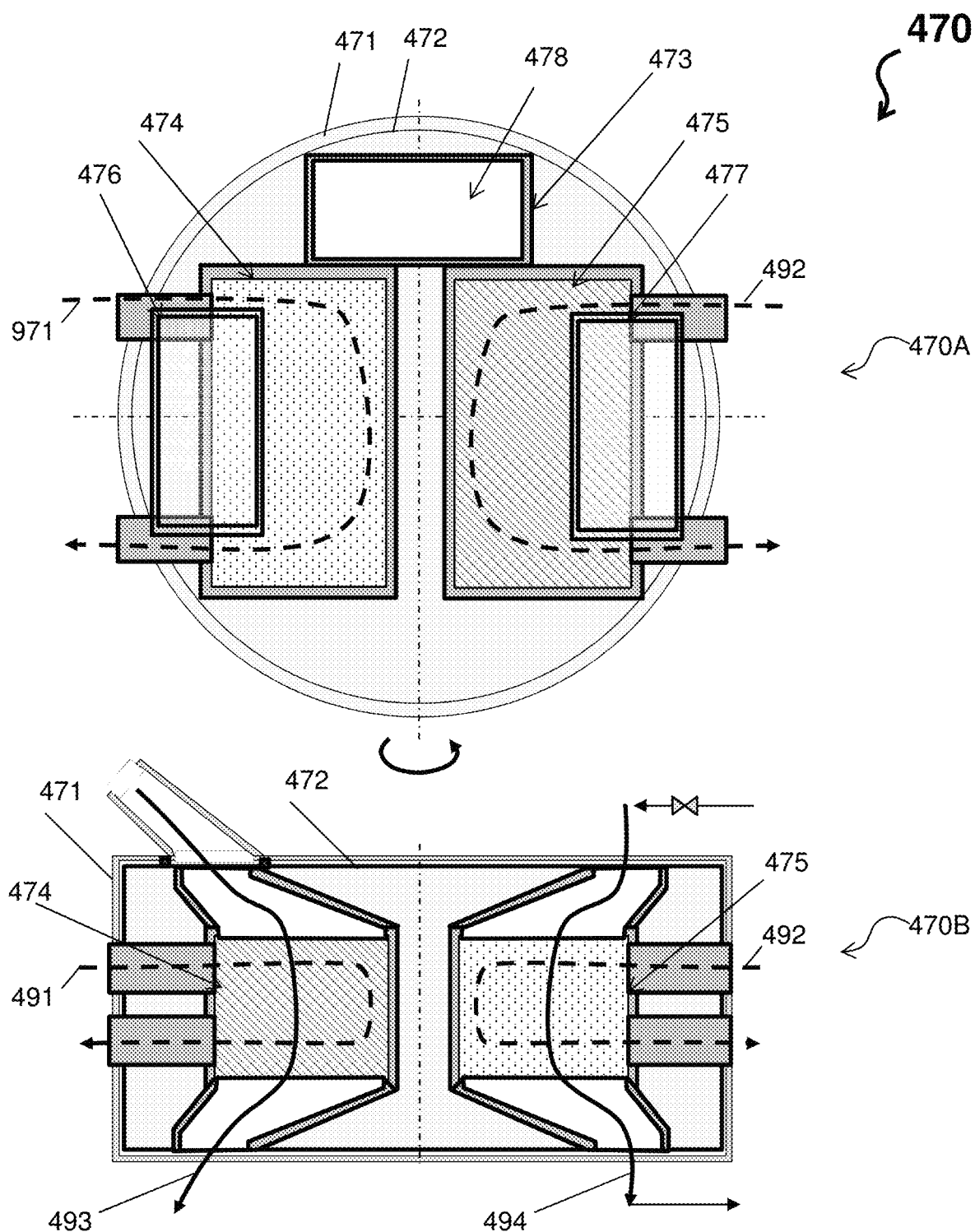
FIG. 4C depicts a drum system in accordance with one or more embodiments.

Turning now to FIG. 4C, a drum system 470 is depicted in accordance with one or more embodiments. The drum system 470 is show from a first view 470A (from a Z perspective above an X-Y plain) and a second view 470B (from the X-Y plain perspective viewing a Z axis). The drum system 470 comprises a drum shell 471, a drum rotational member 472, insulation 473, at least one core (e.g., cores 474, 475—first and second heat exchangers), at least one manifold (e.g., each manifold 476 and 477 corresponding to the cores 474 and 475), a bypass, 478, and at least one cooling path (e.g., cooling paths 491 and 492).

In the intake view 470A, the first medium 493 flows into the cores 474, 475 along the Z-axis. As shown in the second view 400B, the first medium 493 enters through the drum shell 471 and the drum rotational member 472 to pass through an aligned core (e.g., core 474 as shown). In this regard, the drum shell 471 comprises a first fixed entry point for receiving the first medium 493 (and can also have a fixed exit point in accordance with one or more embodiments) and at least one second fixed point of entry for receiving the cooling medium, such that the drum rotational member 472 and components therein rotate within the drum shell 471 to couple one of the cores 474 and 475 with the fixed entry point and the cooling paths 491 and 492 with the at least one second fixed point of entry. The rotational position of the drum rotational member 472 can be in accordance with the modes of operation described herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    at least two heat exchangers being alternatively cooled by an outlet medium wherein the outlet medium cools one of the at least two heat exchangers in a first mode of operation for the system and another of the at least two heat exchangers in a second mode of operation for the system; and
    a cooling circuit providing a cooling medium to the at least two heat exchangers, wherein the cooling circuit includes:
    a cooling load through which the cooling medium flows;
    a plurality of valves, that includes at least a first valve, a second valve, a third valve and a fourth valve, configured so that:
    the first valves is connected to one side of the cooling load and the fourth valves is connected to another side of the cooling load;
    the first and fourth valves are closed whereby the cooling circuit provides the cooling medium in one direction through the circuit to a first heat exchanger of the at least two heat exchangers in accordance with the first mode, and
    the second and third valves are closed whereby the cooling circuit provides the cooling medium in another direction in the cooling circuit that is reversed from the one direction to a second heat exchanger of the at least two heat exchangers in accordance with the second mode; and
    a flow direction of the cooling medium through the cooling load remains constant in the first mode and the second mode.

2. The system of claim 1, wherein, during the first mode, the cooling medium defrosts the first heat exchanger and the cooling medium is cooled by the outlet medium flowing through the second heat exchanger.

3. The system of claim 1, wherein, during the second mode, the cooling medium defrosts the second heat exchanger and the cooling medium is cooled by the outlet medium flowing through the first heat exchanger.

4. The system of claim 1, the system comprising at least one diverter valve directing the outlet medium to the first heat exchanger during the second mode and directing the outlet medium to the second heat exchanger during the first mode.

5. The system of claim 1, the system comprising at least one rotatable valve directing the outlet medium across the first heat exchanger during the second mode and directing the outlet medium across the second heat exchanger during the first mode.

6. The system of claim 1, the system comprising a drum shell and a drum rotational member encasing the at least two heat exchangers,
    wherein the drum shell comprises a fixed entry point for the outlet medium, and
    wherein the drum rotational member rotates within the drum shell to couple the first heat exchanger with the fixed entry point during the second mode and to couple the second heat exchanger with the fixed entry point during the first mode.

7. The system of claim 1, wherein the cooling medium comprises a silicon oil and the outlet medium comprises bleed air.

* * * * *